May 26, 1942. G. D. FRAUNFELDER 2,284,140
TILTABLE BODY EQUIPPED LAND VEHICLE
Filed March 3, 1939 2 Sheets-Sheet 1

Inventor
George D. Fraunfelder.
By
Attorney

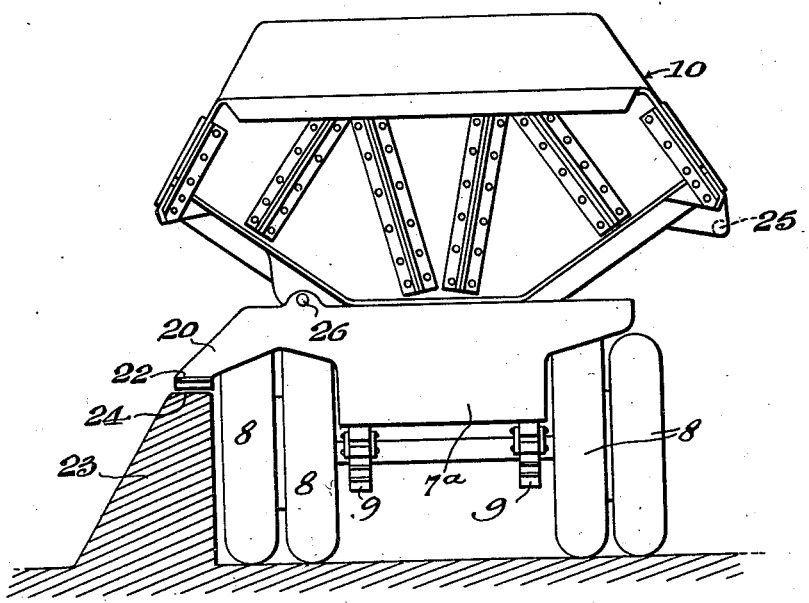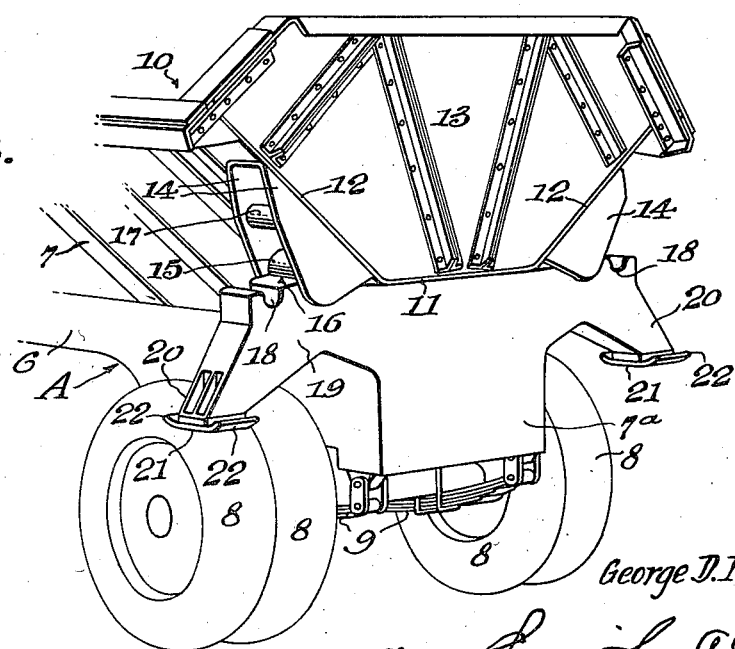

Patented May 26, 1942

2,284,140

UNITED STATES PATENT OFFICE 2,284,140

TILTABLE BODY EQUIPPED LAND VEHICLE

George D. Fraunfelder, Easton, Pa., assignor to Easton Car & Construction Company, Easton, Pa.

Application March 3, 1939, Serial No. 259,650

1 Claim. (Cl. 214—64)

This invention relates to new and useful improvements in land vehicle dump bodies generally, although more particularly to side or end dump bodies embodying either fixed or shifting dump tilt pivots.

In various types of industrial work it is common to use dump trucks or tractor and semi-trailer units having dump bodies in the hauling of relatively large masses of heavy lading such as stone or the like. Such vehicles usually include spring frames and are normally equipped with pneumatic tires designed to withstand certain load conditions. However, in dumping the lading from such vehicles, it has been found that the sudden shifting of the load center of gravity from substantially the median axis of the vehicle towards the edge portion over which the dumping is to be effected causes abnormal loading on the frame and springs and particularly the tires. As a result, it is not an infrequent occurrence for the tires to "blow out" under such conditions.

Another result of such types of operation is the imposition of abnormal twisting stresses on certain parts of the vehicle or semi-trailer chassis including the respective frame members and springs to the detriment thereof.

It is not feasible to provide the vehicles with other pneumatic tires more able to withstand such loadings due to the prohibitive cost of such tires, especially in view of the fact that tire replacement is one of the major items in maintenance of such vehicles. Even if such tires could be economically used, there remains the matter of overcoming or preventing the abnormal torsional stresses on the chassis under load dumping conditions.

Through the use of this invention the above mentioned difficulties have been overcome.

Therefore, the principal object of the invention is to provide a pneumatic tired automotive dump truck or semi-trailer unit having a side or end dump body pivotally mounted on the chassis thereof with ground support engaging means whereby abnormal loading on the tires, springs, and frame of the automotive unit during dumping will be transferred to the ground.

Another object of the invention is to provide a device of the above described character in which certain portions of the chassis are provided with feet which extend beyond the wheels in the direction of dumping and are adapted to overlie and be supported by a ground engaging support under load dumping conditions.

Another object of the invention is to provide a device of the above described character in which the upper portions of the foot elements are shaped to receive a pivot element or elements carried by the tiltable dump body.

A further object of the invention is to provide a device of the above described character which is simple in construction and economical to manufacture, and in which the supporting feet include cam end portions for facilitating movement of the feet into proper relation with the ramp or stand by which they are to be supported.

With these and other objects in view which will more fully appear, the nature of the invention will be more clearly understood by following the description, the appended claim, and the several views illustrated in the accompanying drawings.

In the drawings:

Figure 3 is a fragmentary perspective view illustrating in greater detail two of the feet.

Figure 4 is a rear end elevation of a modified form of the invention in which the body tilts about a single pivot during dumping.

Figure 1:
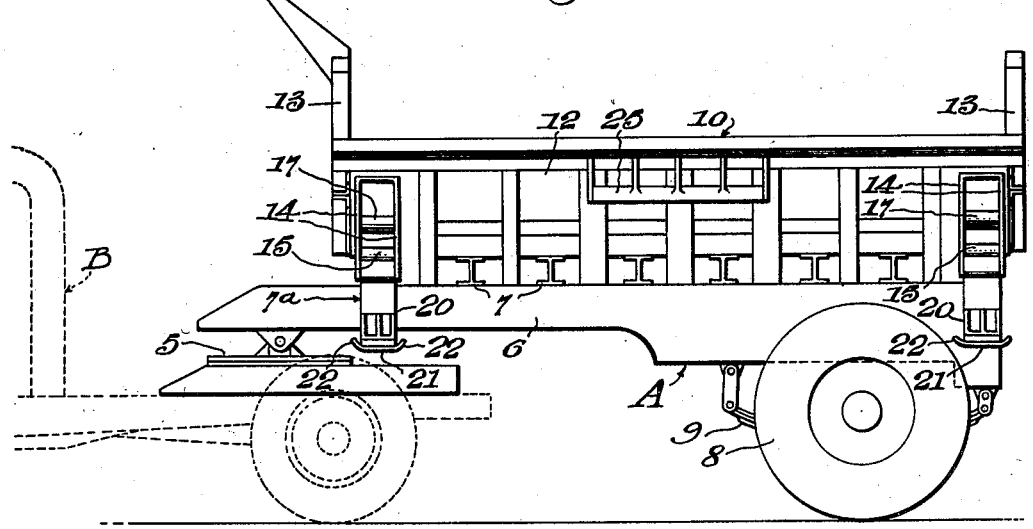
Figure 1 is a side elevation of a semi-trailer unit in which the invention is embodied.
Figure 2:
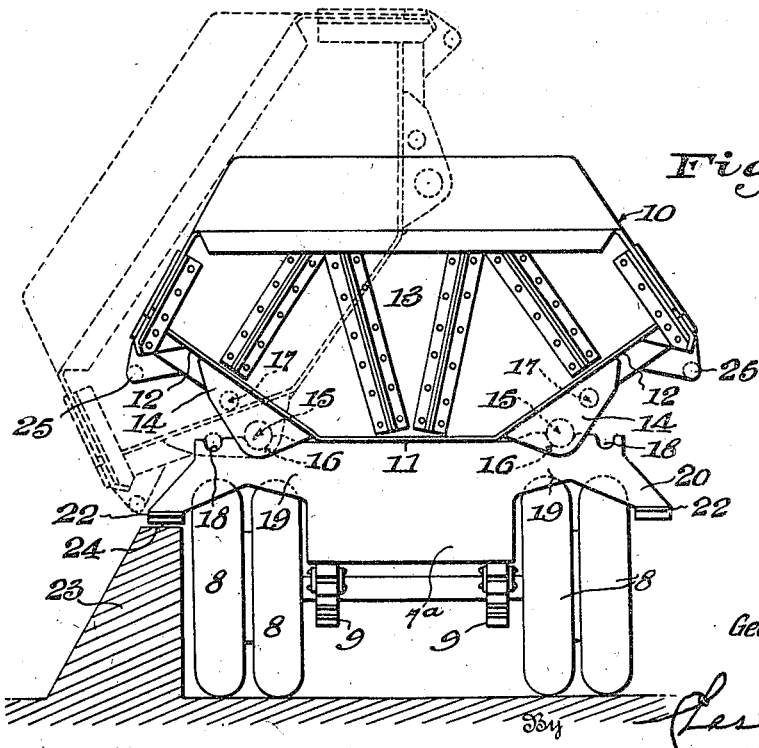
Figure 2 is a rear end elevation thereof, the position of the body under load dumping conditions being shown in dotted lines.

Referring to the drawings in detail, a preferred form of the invention is embodied in a semi-trailer unit A having a conventional fifth wheel connection 5 with a tractor unit B indicated in dotted lines in Figure 1 of the drawings.

The semi-trailer includes a frame which comprises side sills 6 maintained in spaced parallel relation by transverse beams 7. The rear end of the semi-trailer is supported by multiple wheels 8 through the usual springs 9, 9, and the front end is supported by the tractor unit through the fifth wheel 5.

The trailer frame supports a dump body 10 having a bottom 11, sloping side walls 12, 12, and end walls 13, 13 the tops of which extend above the side walls. The body normally rests on the upper surfaces of the transverse beams 7.

The side walls 12 of the body are provided with spaced pairs of outwardly projecting extension plates 14, 14 disposed at the front and rear ends of the side walls. A main pivot shaft 15 is secured between each pair of plates 14 and is disposed with its axis substantially in the plane of the bottom 11. Each pivot shaft 15 is received by a fulcrum groove 16 formed in the associated front and rear transverse frame member or bolster 7ª. A second pivot shaft 17 is secured between each pair of plates 14 and is disposed outwardly from and above the adjacent shaft 15.

As the body is tilted to one side or the other about the pivots 15 for load dumping, the pivots 17 on that side are adapted to be received by fulcrum grooves 18 formed in extensions 19 of the front and rear transverse frame members or bolsters 7ª to thereby effect a shifting of pivot from the shafts 15 to the shafts 17 in order to maintain the center of pivot outwardly of the load center of gravity.

The extensions 19 of the front and rear frame members 7ª respectively terminate in downwardly and outwardly extending foot portions 20 which are disposed outwardly of the vehicle wheels. Each foot portion 20 is provided with a face plate 21 having upturned end portions forming cam faces 22, 22.

These foot portions are adapted to override a supporting ramp or rest 23 having a flat upper face 24 and which is located at the dumping site and disposed in parallelism with the roadway.

In normal hauling and dumping operations the dump truck or unit is driven alongside the ramp 23 in such a manner that the face plates 21 on that side will overlie and just clear the rest face 24. Then a hook from any type of hoist is engaged with a hoisting or tilting bar 25 dependably secured to the off side of the side wall 12 of the body. As the hoist lifts the off side of the body, the body, of course, pivots about the shafts 15 and then about the shafts 17 until the load dumping is effected.

It should be observed that as the body is being tilted from a normal load-receiving position to the dumping position, the center of gravity is progressively shifting from substantially the median axis of the body towards the side at which the dumping occurs. As this shifting of the center of gravity takes place, the frame of the trailer will be depressed towards that side thereby bringing the foot plates 21 on that side into surface contact with the face of the ramp 23 and transferring the major portion of the dead weight loading thereto. As a result, heavy loads can be handled with greater efficiency since the stresses imposed on the vehicle tires, springs and frame are kept to a minimum, and are materially reduced in dumping.

It has been found that through the exercise of reasonable care in maintaining proper air pressure in the vehicle tires and by eliminating overloads on the dump bodies, that the clearance between the foot plates 21 and the ramp face 24 can be kept as little as one inch. In the event of the tires becoming partly deflated, or overloading of the body so that the foot plates 21 are lower than normal, the upturned cam faces 22 will engage the end of the ramp and exert a camming or lifting action on the frame to enable the foot plates 21 to ride onto the ramp face 24 in the proper manner.

Figure 4 of the drawings discloses a slightly modified form of the invention in which the dump body is adapted to pivot only to one side about a single fixed pivot 26, and the foot extensions are provided only on the side at which dumping occurs.

Thus, it will be seen that the invention provides new and useful improvements in vehicle dump body construction consisting in the provision of outwardly extending foot portions on the frame which are adapted to engage a rigid ground support or ramp in order to relieve the component vehicle parts from abnormal stresses during dumping operations.

It is of course to be understood that the details of structure and arrangement of parts may be variously changed and modified without departing from the spirit and scope of my invention.

I claim:

The combination of a land vehicle including wheels, pneumatic tires on said wheels, a frame, means including springs for supporting said frame on said wheels, a dump body tiltable to discharge a load over a side edge portion of said body, means for mounting said dump body on said frame including a main pivot shaft engageable with said frame and a second pivot shaft disposed outwardly from and above said main shaft, a roadside load-supporting ramp located at a dumping side, and supporting feet extending from each end of the frame in the direction of dumping and adapted to be brought into close proximity to and directly over said ramp whereby as a load is dumped from said body said feet will engage said ramp and relieve the stresses imposed as an incident to said dumping on the tires, springs, and frame of said vehicle, said feet being provided with fulcrum grooves formed in the upper portions thereof and adapted to receive said second pivot shaft as the body is being tilted to thereby effect a shifting of pivot from said main shaft to said second shaft to maintain the center of pivot outwardly of the load center of gravity.

GEORGE D. FRAUNFELDER.